United States Patent
Chen et al.

(10) Patent No.: US 12,471,898 B2
(45) Date of Patent: Nov. 18, 2025

(54) IN VIVO OCCLUSION AND CLAMPING INSTRUMENT

(71) Applicant: Shanghai ConFlow MedTech Co., Ltd., Shanghai (CN)

(72) Inventors: Xiumin Chen, Shanghai (CN); Baicheng Hu, Shanghai (CN)

(73) Assignee: Shanghai ConFlow MedTech Co., Ltd., Shanghai (CN)

( * ) Notice: Subject to any disclaimer, the term of this patent is extended or adjusted under 35 U.S.C. 154(b) by 0 days.

(21) Appl. No.: 19/010,570

(22) Filed: Jan. 6, 2025

(65) Prior Publication Data

US 2025/0134508 A1 May 1, 2025

Related U.S. Application Data

(63) Continuation of application No. PCT/CN2022/128210, filed on Oct. 28, 2022.

(30) Foreign Application Priority Data

Jul. 16, 2022 (CN) .......................... 202210835295.9

(51) Int. Cl.
*A61B 17/00* (2006.01)

(52) U.S. Cl.
CPC ...... *A61B 17/0057* (2013.01); *A61B 2017/00592* (2013.01); *A61B 2017/00597* (2013.01); *A61B 2017/00615* (2013.01); *A61B 2017/00632* (2013.01); *A61B 2017/00991* (2013.01)

(58) Field of Classification Search
CPC ...... A61B 17/0057; A61B 2017/00575; A61B 2017/00592; A61B 2017/00597; A61B 2017/00606; A61B 2017/22035; A61B 2017/00623; A61B 2018/00351; A61B 2018/00023; A61B 2017/2215; A61F 2/2412; A61F 2/2418; A61F 2/2427
See application file for complete search history.

(56) References Cited

U.S. PATENT DOCUMENTS

| | | | |
|---|---|---|---|
| 2002/0111647 A1* | 8/2002 | Khairkhahan | ... A61B 17/12172 606/200 |
| 2003/0139819 A1* | 7/2003 | Beer | ............ A61B 17/0057 623/23.71 |
| 2012/0172927 A1* | 7/2012 | Campbell | ........ A61B 17/12172 606/213 |
| 2012/0283585 A1* | 11/2012 | Werneth | ............ A61P 9/06 606/200 |
| 2022/0022854 A1* | 1/2022 | Lashinski | ........ A61B 17/12013 |

* cited by examiner

*Primary Examiner* — Mohamed G Gabr
(74) *Attorney, Agent, or Firm* — Westbridge IP LLC

(57) ABSTRACT

An in vivo occlusion and clamping instrument includes a disc-shaped portion, a clamping portion and a flow-blocking portion. The disc-shaped portion is elastically deformable so that the disc-shaped portion has a folded posture in which same can be received in a sheath and a free posture in which same can expand into a disc shape. The clamping portion is fixed on one side surface of the disc-shaped portion, wherein the clamping portion is elastically deformable so that the clamping portion has a folded posture in which same can be received in the sheath and a free posture in which same can be unfolded, the clamping portion, when in the free posture, is pressed against the disc-shaped portion via elasticity so that the clamping portion and the disc-shaped portion can cooperate with each other for clamping and fixing.

13 Claims, 3 Drawing Sheets

IN VIVO OCCLUSION AND CLAMPING INSTRUMENT

CROSS-REFERENCE TO RELATED APPLICATIONS

This application is a continuation of International Application No. PCT/CN2022/128210, filed on Oct. 28, 2022, which claims priority to Chinese Patent Application No. 202210835295.9, filed on Jul. 16, 2022. All of the aforementioned applications are incorporated herein by reference in their entireties.

TECHNICAL FIELD

The application relates to the technical field of interventional therapy instruments, in particular to an in vivo occlusion and clamping instrument.

BACKGROUND

The unclosed foramen ovale refers to that the primary diaphragm and secondary diaphragm of the infant are not completely fused in the development process to form a fissure-like channel, i.e., Patent Formaten Ovale. An adult has a PFO occurrence probability of 25%. In recent years, related studies on PFO and cryptogenic stroke have shown that PFO may be a hidden source of embolism in patients with cryptogenic stroke. Therefore, for PFO-related stroke patients, transcatheter occlusion of PFO surgery has become a relatively good choice.

At present, a traditional double disc-shaped occluder is mainly used clinically, and for a patient with the aortic root protruding and abutting against the fossa ovale, the occluder with such a structure easily causes abrasion to the aortic root of the patient. In addition, the existing occluder is only relatively effective in cases in which the overlap of the primary diaphragm and the secondary diaphragm is relatively short, but it is found in clinic that the overlapping length of the primary diaphragm and the secondary diaphragm of some patients is relatively long, and even can reach 15-20 mm; the existing occluder is not friendly to the tissue of the overlapping part, and after the overlapping tissue is stacked on the waist of the double disc-shaped occluder, a large residual flow will be generated between the primary diaphragm and the secondary diaphragm.

SUMMARY

An object of the present application is to provide an in vivo occlusion and clamping instrument, so as to solve the technical problems in the prior art that a traditional occluder is prone to wear on the aortic root of a patient, is only effective for cases in which primary diaphragm and secondary diaphragm overlap relatively short, is unfriendly to the tissue of the overlapping part, and after the overlapping tissue is stacked on the waist of a double disc-shaped occluder, a large residual flow will be generated between the primary diaphragm and secondary diaphragm.

In order to achieve the above object, the present application adopts the following technical solutions.

An in vivo occlusion and clamping instrument includes:
a disc-shaped portion being elastically deformable so that the disc-shaped portion has a folded posture capable of being received into a sheath and a free posture capable of being expanded into a disc shape;
a clamping portion fixed on a side surface of the disc-shaped portion, the clamping portion being elastically deformable, so that the clamping portion has a folded posture capable of being received into a sheath and an unfolded free posture, the clamping portion being pressed toward the disc-shaped portion by means of elasticity when in the free posture, so that the clamping portion and the disc-shaped portion can cooperate with each other for clamping and fixing, and a gap for accommodating tissue being provided inside the clamping portion;
a flow-blocking portion mounted on the disc-shaped portion and/or the clamping portion.

In one embodiment, the clamping portion includes: a plurality of elastic arms uniformly distributed around, each elastic arm comprises a tail end extending towards the direction of the disc-shaped portion, and when the elastic arms are in a free posture, the tail ends are pressed towards the direction of the disc-shaped portion.

In one embodiment, the clamping portion is connected to the disc-shaped portion through a base, the elastic arm comprises a first elastic section and a second elastic section connected at an acute angle, an end of the first elastic section is fixed to the base, and an end of the second elastic section extends toward the disc-shaped portion; and the gap is formed between the first elastic section and the second elastic section and between adjacent elastic arms.

In one embodiment, the flow-blocking portion comprises a plurality of flow blocking sleeves, corresponding to the plurality of elastic arms one to one, wherein each flow blocking sleeves is sleeved on the corresponding elastic arm, and ends of the flow blocking sleeves are connected into a whole.

In one embodiment, the clamping portion comprises an elastic strip spirally surrounding, an inner end of the elastic strip is fixed to the disc-shaped portion, an outer end of the elastic strip is connected to the disc-shaped portion through a pull strip, and when in a free posture, the elastic strip is expanded in a disc shape and pressed towards the disc-shaped portion.

In one embodiment, a fixing sleeve is provided in the center of the disc-shaped portion, and the fixing sleeve comprises:
a telescopic section, wherein one end of the telescopic section is connected to the center of the disc-shaped portion, and the other end of the telescopic section extends toward the clamping portion;
a fixing section fixed to the other end of the telescopic section;
wherein the clamping portion is fixed on the fixing section.

In one embodiment, the telescopic section is a tubular structure, and the tube wall is a memory metal mesh, or the telescopic section is a spring structure.

In one embodiment, the center of the telescopic section is further provided with a guide rod, one end of the guide rod is fixed to the center of the disc-shaped portion, the other end of the guide rod passes through the fixed section, and the clamping portion is slidably disposed along the guide rod.

In one embodiment, the disc-shaped portion is formed by shaping a bag-shaped elastic woven mesh, and the bag opening part of the disc-shaped portion is bundled and fixed to form a fixing sleeve; or the disc-shaped portion is a double-layer structure comprising a first woven mesh disc and a second woven mesh disc connected as a whole at the edge, and end portions of the first woven mesh disc and the second woven mesh disc are bundled and fixed to form a fixing sleeve.

In one embodiment, the flow-blocking portion comprises:
a first flow blocking membrane attached to a side surface of interior of the disc-shaped portion facing the clamping portion;
a second flow blocking membrane attached to a side surface of the interior of the disc-shaped portion away from the clamping portion, wherein the orthographic projection of the second flow blocking membrane on a side surface of the interior of the disc-shaped portion away from the clamping portion covers the edge of the disc-shaped portion.

In one embodiment, the flow-blocking portion comprises:
a first flow blocking membrane attached to a side surface of the interior of the disc-shaped portion facing the clamping portion;
a second flow blocking membrane attached in the disc-shaped portion, wherein the edge of the second flow blocking membrane is fixed to the edge of the disc-shaped portion.

In one embodiment, the second flow blocking membrane extends to protrude from the edge of the disc-shaped portion.

In one embodiment, the orthographic projection of the clamping portion on the disc-shaped portion is arranged beyond the edge of the disc-shaped portion.

Different from the prior art, the present application has the following beneficial effects.

The in vivo occlusion and clamping instrument of the present application includes a disc-shaped portion and a clamping portion, wherein the clamping portion has a relatively small surface area, while cooperating with the disc-shaped portion to clamp the tissues on both sides of the foramen ovale channel, the risk of thrombus is effectively reduced, and meanwhile the aortic root is prevented from being worn.

The clamping portion is foldable to store the tissues on both sides of the foramen ovale channel, so as to effectively avoid residual shunting.

The distance between the clamping portion and the disc-shaped portion is adjustable, so that the occluder can adapt to patients with different foramen ovale channel lengths, and the clamping stability is effectively guaranteed.

BRIEF DESCRIPTION OF THE DRAWINGS

In order to more clearly describe the specific embodiments of the present application or the technical solutions in the prior art, the following briefly describes the accompanying drawings required in the description of the specific embodiments or the prior art. In all figures, like elements or portions are generally identified by like reference numerals. In the drawings, elements or parts are not necessarily drawn to scale.

DETAILED DESCRIPTION OF THE EMBODIMENTS

Embodiments of the technical solutions of the present application will be described in detail below with reference to the accompanying drawings. The following embodiments are only used to describe the technical solutions of the present disclosure more clearly, and therefore are merely examples, and cannot limit the protection scope of the present disclosure.

It should be noted that, unless otherwise specified, technical terms or scientific terms used in this application should have a general meaning understood by those skilled in the art to which this application belongs.

Figure 1:
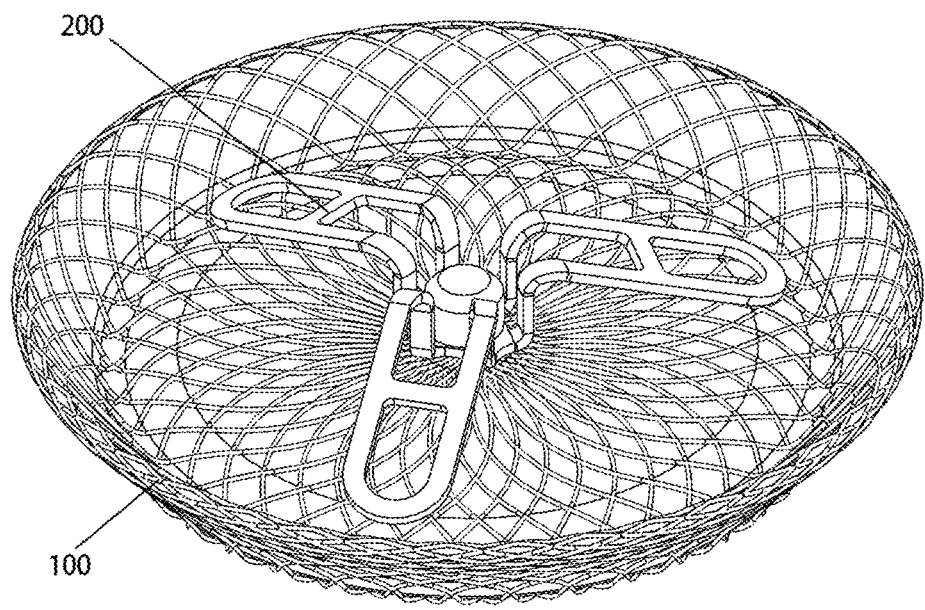
FIG. 1 is a schematic structural diagram of an embodiment of an in vivo occlusion and clamping instrument of the present application.
Figure 2:
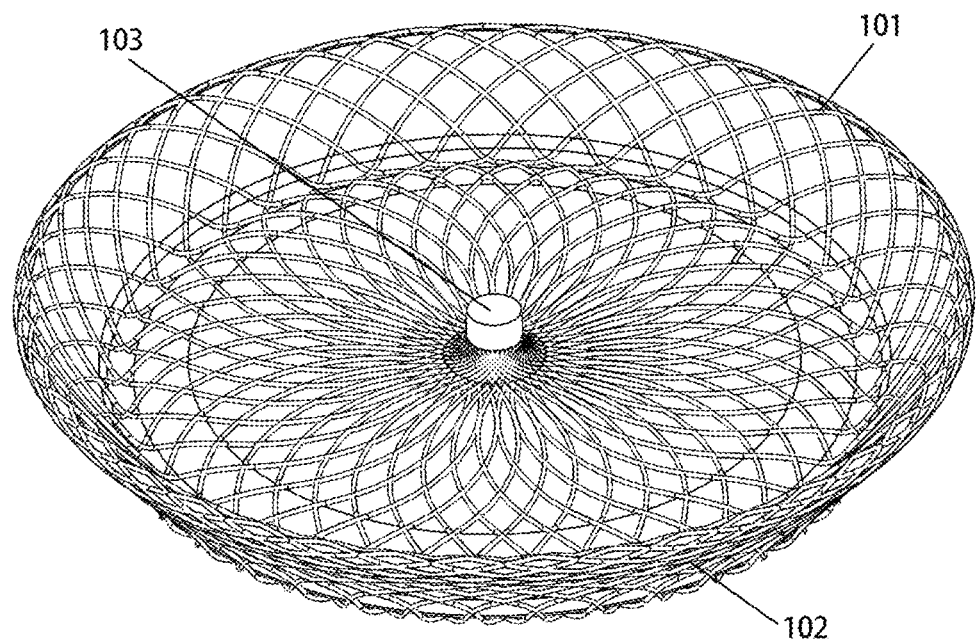
FIG. 2 is a schematic structural diagram of an embodiment of a disc-shaped portion of the present application.
Figure 3:
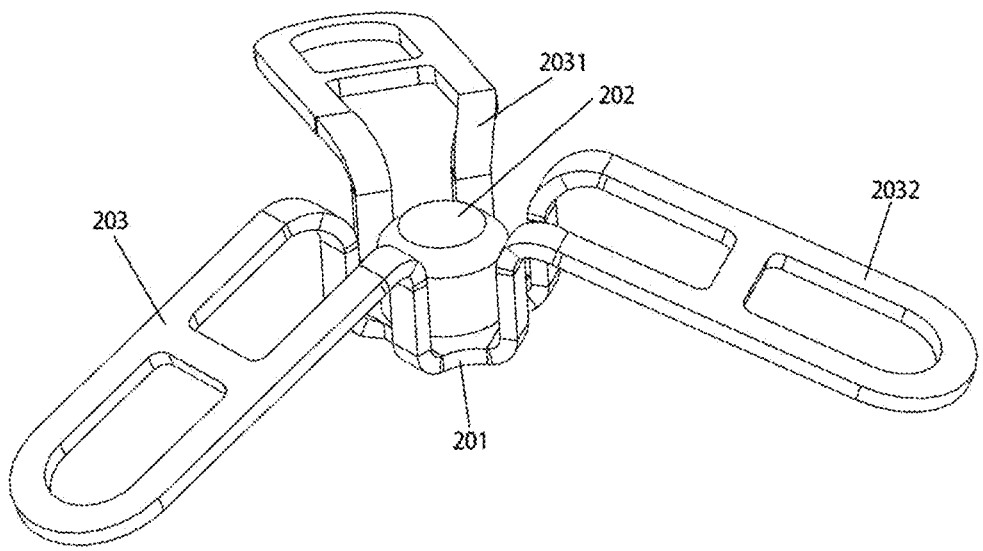
FIG. 3 is a schematic structural diagram of an embodiment of a clamping portion of the present application.

Referring to FIG. 1, FIG. 2 and FIG. 3, FIG. 1 is a schematic structural diagram of an embodiment of an in vivo occlusion and clamping instrument of the present application, FIG. 2 is a schematic structural diagram of an embodiment of a disc-shaped portion 100 of the present application, and FIG. 3 is a schematic structural diagram of an embodiment of a clamping portion 200 of the present application.

The in vivo occlusion and clamping instrument comprises a disc-shaped portion 100 and a clamping portion 200 which are respectively arranged on two sides.

The disc-shaped portion 100 is a double-layer structure and includes a first woven mesh disc 101 and a second woven mesh disc 102 connected as a whole at the edge. A fixing sleeve 103 is provided in the middle of the disc-shaped portion 100 to fix the end of the woven mesh.

In other embodiments, the disc-shaped portion 100 may also be shaped by a bag-shaped elastic woven mesh, and the bag opening part of the disc-shaped portion 100 is bundled and fixed by the fixing sleeve 103 to achieve the effect of this embodiment.

The clamping portion 200 is fixed on the fixing sleeve 103, and the clamping portion 200 includes a base 201, the base 201 is provided with a through hole matched with the fixing sleeve 103, and the base 201 is sleeved on the fixing sleeve 103.

A fixing base 202 is disposed on a side of the base 201 away from the fixing sleeve 103, and the fixing base 202 is fixed to an end of the fixing sleeve 103 to limit the base 201 on the fixing sleeve 103. In an application scenario, threads may be provided on an outer peripheral surface of one end, close to the fixing base 202, of the fixing sleeve 103, so that the fixing base 202 can be fixed to the fixing sleeve 103 through a threaded structure, and in other application scenarios, other fixing manners, such as welding, clamping, crimping, etc., may also be used to achieve the effect of this embodiment.

Three elastic arms 203 evenly distributed around the base 201 are disposed on the base 201, and each elastic arm 203 includes a first elastic section 2031 and a second elastic section 2032 connected to each other. One end of the first elastic section 2031 is connected to the base 201, the other end of the first elastic section 2031 extends toward the fixing base 202, one end of the second elastic section 2032 is connected to the other end of the first elastic section 2031, and the other end of the second elastic section 2032 extends toward the fixing base 202.

When the elastic arm 203 is in a free posture, an acute angle of 15-70 degrees is formed between the first elastic segment 2031 and the second elastic segment 2032.

The elastic arm 203 is made of memory metal such as nitinol, and can be folded and inserted into a sheath and conveyed to the affected part, and can be automatically restored and expanded after being separated from the sheath.

In this embodiment, the elastic arm 203 is fixed on the fixing sleeve 103 by using the base 201 and the fixing base 202, and in other embodiments, the elastic arm 203 may also use other fixing manners, for example, clamping, welding, crimping, and the like, to achieve the effect of this embodiment.

It can be understood that, since the elastic arm 203 is pressed towards one side of the disc-shaped portion 100 when in the free posture, the instrument can be clamped and fixed at the foramen ovale, and the tissues on both sides of the foramen ovale channel are better clamped and pressed together. In addition, since the surface area of the elastic arm 203 is small, the risk of thrombus on the primary diaphragm side on one side of the foramen ovale channel can be effectively reduced.

At the same time, the space formed between the first elastic section 2031 and the second elastic section 2032 in the elastic arm 203 and the space between the elastic arms 203 can accommodate the overlapping wrinkles of the primary diaphragm and secondary diaphragm on both sides of the foramen ovale channel, thereby effectively avoiding the generation of residual flow.

Figure 4:
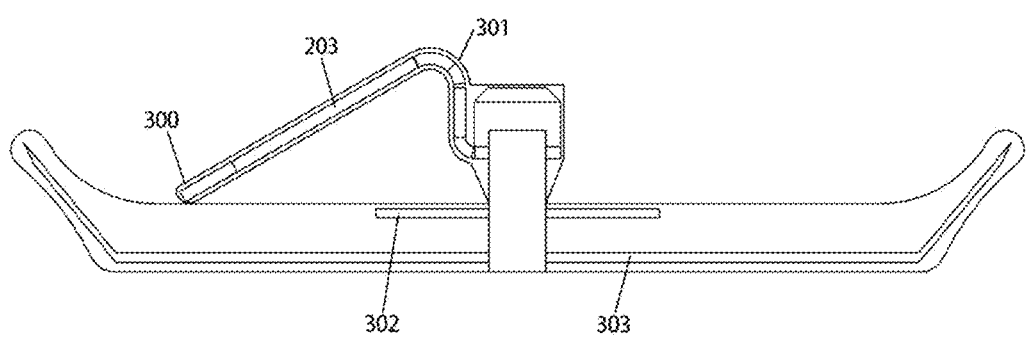
FIG. 4 is a section structure diagram of an embodiment of an in vivo occlusion and clamping instrument of the present application.

In order to ensure the flow-blocking effect of the clamping instrument of the present application and further avoid residual flow splitting, please refer to FIG. 4, which is a section structure diagram of an embodiment of the in vivo occlusion and clamping instrument of the present application.

The present application further includes a flow-blocking portion 300, and the flow-blocking portion 300 includes a flow blocking sleeve 301 disposed on the clamping portion 200, and a first flow blocking membrane 302 disposed on the disc-shaped portion 100 and a second flow blocking membrane 303 disposed on the disc-shaped portion 100.

Specifically, the flow-blocking portion 300 includes three flow blocking sleeves 301 corresponding to the three elastic arms 203, the flow blocking sleeves 301 are sleeved on the corresponding elastic arms 203, and ends of the three flow blocking sleeves 301 are connected into a whole to integrally wrap the elastic arms. On one hand, the flow blocking sleeve 301 can increase the contact area, prevent the protruding structure from sliding into the foramen ovale, and also can accelerate the endothelialization process and improve the flow blocking effect.

The first flow blocking membrane 302 is attached to a side surface of the interior of the disc-shaped portion 100 facing the clamping portion 200; the second flow blocking membrane 303 is attached to a side surface of the interior of the disc-shaped portion 100 away from the clamping portion 200, and the second flow blocking membrane 302 extends to protrude from the edge of the disc-shaped portion 100.

The disc-shaped portion 100 adopts a large and small double-layer film covering design, the first flow blocking membrane 302 is a small disc membrane, and is fixed by means of sewing, bonding and the like, so that the first flow blocking membrane 302 is closer to the atrial wall to achieve the effect of directly blocking and accelerating endothelialization, and meanwhile, backflow is further reduced to a certain extent. The second flow-blocking membrane 303 is a large disc membrane, which can effectively and fully block residual flow, and meanwhile, the edge of the second flow blocking membrane 303 partially penetrates out of the edge of the disc-shaped portion 100, so as to be attached to human tissue early to realize endothelialization.

It can be understood that, in other embodiments, the second flow blocking membrane 303 may also be directly suspended inside the disc-shaped portion 100, and the second flow blocking membrane 303 and the edge of the disc-shaped portion 100 are sewn and fixed to achieve installation and fixation thereof, which can achieve the effect of this embodiment. In other embodiments, the edge of the second flow blocking membrane 303 may not pass through the edge of the disc-shaped portion 100.

Figure 5:
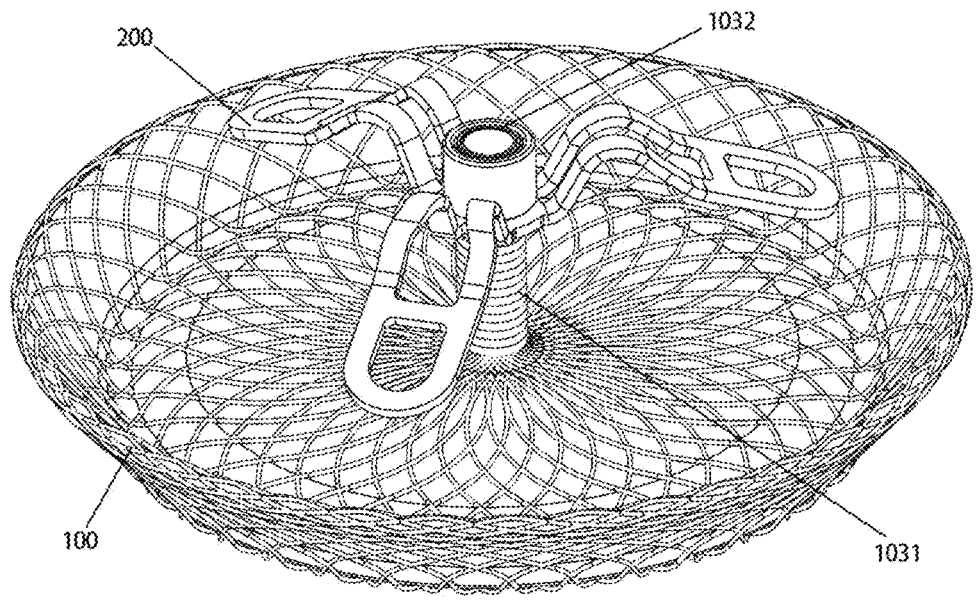
FIG. 5 is a schematic structural diagram of another embodiment of an in-vivo occlusion and clamping instrument of the present application.

Since the foramen ovale channels of some patients are long, in order to further meet the needs of these patients and improve the popularity and adaptability of the occlusion and clamping instrument of the present application, please refer to FIG. 5, which is a schematic structural diagram of another embodiment of the in vivo occlusion and clamping instrument of the present application.

As shown in the figure, the fixing sleeve 103 in this embodiment adopts a double-section design, and comprises a telescopic section 1031 and a fixing section 1032. The telescopic section 1031 is telescopically arranged, one end of the telescopic section 1031 is connected with the center of the disc-shaped portion 100, and the other end of the telescopic section 1031 extends towards the clamping portion 200 and is connected with the fixing section 1032.

The clamping portion 200 is fixed on the fixing section 1032. Specifically, the telescopic section 1031 adopts a spring structure.

It can be understood that due to the existence of the telescopic section 1031, the distance between the clamping portion 200 and the disc-shaped portion 100 can be adjusted, so as to adapt to patients with different foramen ovale channel lengths, and under the elastic force of the telescopic section 1031, the clamping force between the clamping portion 200 and the disc-shaped portion 100 can be further improved.

In other embodiments, the telescopic section 1031 may also adopt a tubular structure, for example, the tube wall of the nickel-titanium metal tube is integrally cut to form a mesh structure, or a nickel-titanium metal mesh is adopted to be formed, which can achieve the effect of this embodiment.

Further, in order to avoid the force deflection of the clamping portion 200 caused by the telescopic section 1031 during the telescopic movement, in other embodiments, a guide rod may be provided in the center of the telescopic section 1031, one end of the guide rod is configured to be fixed to the center of the disc-shaped portion 100, and the other end of the guide rod passes through the fixing section 1032. Therefore, the clamping portion 200 and the fixing section 1032 can slide along the guide rod, so as to limit the sliding direction of the clamping portion 200 and ensure uniform force application.

Figure 6:
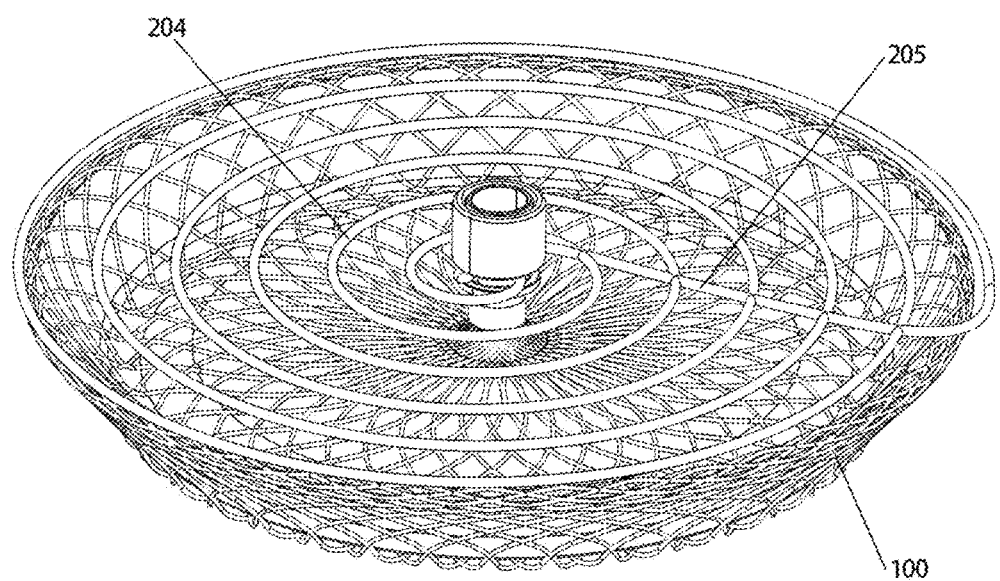
FIG. 6 is a schematic structural diagram of still another embodiment of an in vivo occlusion and clamping instrument of the present application.

It can be understood that, the clamping portion 200 in the present embodiment acts to press downward toward the disc-shaped portion 100 to cooperate with clamping the primary diaphragm and the secondary diaphragm on both sides of the foramen ovale channel, and meanwhile, the overlapping portion of the primary diaphragm and the secondary diaphragm is accommodated to avoid residual shunting. The clamping portion 200 of other structures can also achieve the effect of the present embodiment, referring to FIG. 6, FIG. 6 is a schematic structural diagram of another embodiment of the in vivo occlusion and clamping instrument of the present application.

As shown in the figure, in the present embodiment, the clamping portion 200 adopts an elastic strip 204 spirally surrounding, an inner end of the elastic strip 204 is fixed to the fixing sleeve 103, an outer end of the elastic strip 204 is connected to the fixing sleeve 103 through a pull strip 205, and when in a free posture, the elastic strip 204 is expanded in a disc shape and pressed in the direction of the disc-shaped portion 100.

The elastic strip 204 may be supported by a shape memory material such as nickel-titanium metal, and may be folded into a sheath for delivery, and may also be unfolded to press the disc-shaped portion 100 after being separated from the sheath, thereby achieving clamping matching with the disc-shaped portion 100.

The elastic strip 204 is spirally surrounded in a disc shape, the overall surface area is small, and the risk of thrombus can be effectively avoided; and meanwhile, the gap inside the elastic strip 204 can also accommodate the overlapping part of the primary diaphragm and the secondary diaphragm to avoid residual flow.

It can be understood that this embodiment only shows the technical solution that when the fixing sleeve 103 of the disc-shaped portion 100 has the telescopic section 1031, the clamping portion 200 adopts the elastic strip 204 spirally surrounding, and when the fixing sleeve 103 adopts other structures, the elastic strip 204 spirally surrounding can still be used as the clamping portion 200, and the effects of this embodiment can be achieved.

It should be noted that the orthographic projection of the clamping portion 200 on the disc-shaped portion 100 shown in the above embodiments is completely located in the disc-shaped portion 100, that is, the unfolded area of the clamping portion 200 is smaller than that of the disc-shaped portion 100, and in other embodiments, the orthographic projection of the clamping portion 200 on the disc-shaped portion 100 may be disposed beyond the edge of the disc-shaped portion 100, which can achieve the effect of the present embodiment.

In the present specification, numerous specific details are described. However, it will be appreciated that embodiments of the application may be practiced without these specific details. In some embodiments, well-known methods, structures, and techniques are not shown in detail so as not to obscure the understanding of the present specification.

In the description of this specification, reference to the terms "one embodiment", "some embodiments", "an example", "a specific example", "some examples", or the like means that a specific feature, structure, material, or characteristic described in connection with the embodiment or example is included in at least one embodiment or example of the present disclosure. In this specification, the schematic expressions of the above terms are not necessarily directed to the same embodiments or examples. Moreover, the specific features, structures, materials, or characteristics described may be combined in any one or more embodiments or examples in a suitable manner. In addition, those skilled in the art may combine and combine different embodiments or examples described in this specification and features of different embodiments or examples without contradicting each other.

Finally, it should be noted that the foregoing embodiments are only used to describe the technical solutions of the present disclosure, but not to limit the technical solutions; although the present disclosure is described in detail with reference to the foregoing embodiments, those skilled in the art should understand that the technical solutions described in the foregoing embodiments may still be modified, or some or all of the technical features may be equivalently replaced; and these modifications or substitutions do not make the essence of the corresponding technical solutions depart from the scope of the technical solutions of the embodiments of the present disclosure, and should be covered in the scope of the claims and the specification of the present disclosure.

What is claimed is:

1. An in vivo occlusion and clamping instrument, comprising:
   a disc-shaped portion being elastically deformable so that the disc-shaped portion has a folded posture capable of being received into a sheath and a free posture capable of being expanded into a disc shape;
   a clamping portion fixed on a side surface of the disc-shaped portion, the clamping portion being elastically deformable, so that the clamping portion has a folded posture capable of being received into a sheath and an unfolded free posture, the clamping portion being pressed toward the disc-shaped portion by means of elasticity when in the free posture, so that the clamping portion and the disc-shaped portion can cooperate with each other for clamping and fixing, and a gap for accommodating tissue being provided inside the clamping portion; and
   a flow-blocking portion mounted on the disc-shaped portion and/or the clamping portion;
   wherein the clamping portion comprises an elastic strip spirally surrounding, an inner end of the elastic strip is fixed to the disc-shaped portion, an outer end of the elastic strip is connected to the disc-shaped portion through a pull strip, and when in a free posture, the elastic strip is expanded in a disc shape and pressed towards the disc-shaped portion.

2. The in vivo occlusion and clamping instrument according to claim 1, wherein the clamping portion comprises a plurality of elastic arms uniformly distributed around, each elastic arm comprises a tail end extending towards the direction of the disc-shaped portion, and when the elastic arms are in a free posture, the tail ends are pressed towards the direction of the disc-shaped portion.

3. The in vivo occlusion and clamping instrument according to claim 2, wherein the clamping portion is connected to the disc-shaped portion through a base, each elastic arm comprises a first elastic section and a second elastic section connected at an acute angle, an end of the first elastic section is fixed to the base, and an end of the second elastic section extends toward the disc-shaped portion; and the gap is formed between the first elastic section and the second elastic section and between adjacent elastic arms.

4. The in vivo occlusion and clamping instrument according to claim 2, wherein the flow-blocking portion comprises a plurality of flow blocking sleeves, corresponding to the plurality of elastic arms one to one, each flow blocking sleeves is sleeved on the corresponding elastic arm, and ends of the flow blocking sleeves are connected into a whole.

5. The in vivo occlusion and clamping instrument according to claim 1, wherein a fixing sleeve is provided in a center of the disc-shaped portion, and the fixing sleeve comprises:
   a telescopic section, wherein one end of the telescopic section is connected to the center of the disc-shaped portion, and the other end of the telescopic section extends toward the clamping portion; and
   a fixing section fixed to the other end of the telescopic section;

wherein the clamping portion is fixed on the fixing section.

6. The in vivo occlusion and clamping instrument according to claim 5, wherein the telescopic section is of a tubular structure, and the tube wall is of a memory metal mesh, or the telescopic section is of a spring structure.

7. The in vivo occlusion and clamping instrument according to claim 6, wherein the center of the telescopic section is further provided with a guide rod, one end of the guide rod is fixed to the center of the disc-shaped portion, the other end of the guide rod passes through the fixed section, and the clamping portion is slidably disposed along the guide rod.

8. The in vivo occlusion and clamping instrument according to claim 1, wherein the disc-shaped portion is formed by shaping a bag-shaped elastic woven mesh, and the bag opening part of the disc-shaped portion is bundled and fixed to form a fixing sleeve; or the disc-shaped portion is a double-layer structure comprising a first woven mesh disc and a second woven mesh disc connected as a whole at the edge, and end portions of the first woven mesh disc and the second woven mesh disc are bundled and fixed to form a fixing sleeve.

9. The in vivo occlusion and clamping instrument according to claim 8, wherein the flow-blocking portion comprises:
   a first flow blocking membrane attached to a side surface of interior of the disc-shaped portion facing the clamping portion; and
   a second flow blocking membrane attached to a side surface of the interior of the disc-shaped portion away from the clamping portion, wherein the orthographic projection of the second flow blocking membrane on a side surface of the interior of the disc-shaped portion away from the clamping portion covers the edge of the disc-shaped portion.

10. The in vivo occlusion and clamping instrument according to claim 9, wherein the second flow blocking membrane extends to protrude from the edge of the disc-shaped portion.

11. The in vivo occlusion and clamping instrument according to claim 8, wherein the flow-blocking portion comprises:
   a first flow blocking membrane attached to a side surface of the interior of the disc-shaped portion facing the clamping portion; and
   a second flow blocking membrane attached in the disc-shaped portion, wherein the edge of the second flow blocking membrane is fixed to the edge of the disc-shaped portion.

12. The in vivo occlusion and clamping instrument according to claim 11, wherein the second flow blocking membrane extends to protrude from the edge of the disc-shaped portion.

13. The in vivo occlusion and clamping instrument according to claim 1, wherein the orthographic projection of the clamping portion on the disc-shaped portion is arranged beyond the edge of the disc-shaped portion.

* * * * *